United States Patent
Yu et al.

(10) Patent No.: US 9,919,739 B2
(45) Date of Patent: Mar. 20, 2018

(54) INDICATION OF VEHICLE DIRECTION OF TRAVEL

(71) Applicant: Ford Global Technologies, LLC, Dearborn, MI (US)

(72) Inventors: Hai Yu, Canton, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 15/015,167

(22) Filed: Feb. 4, 2016

(65) Prior Publication Data

US 2017/0225710 A1    Aug. 10, 2017

(51) Int. Cl.
*B62D 15/02* (2006.01)
*B60W 30/06* (2006.01)

(52) U.S. Cl.
CPC .......... *B62D 15/025* (2013.01); *B60W 30/06* (2013.01)

(58) Field of Classification Search
None
See application file for complete search history.

(56) References Cited

U.S. PATENT DOCUMENTS

| 6,163,742 A | 12/2000 | Shimizu |
| 6,477,480 B1 | 11/2002 | Tseng et al. |
| 6,714,851 B2 | 3/2004 | Hrovat et al. |
| 7,451,033 B2 | 11/2008 | Xu et al. |
| 8,793,035 B2 | 7/2014 | Yu et al. |
| 2015/0165905 A1 | 6/2015 | Filev et al. |
| 2015/0166073 A1 | 6/2015 | D'Amato et al. |
| 2015/0274174 A1 | 10/2015 | Tao et al. |

*Primary Examiner* — Rami Khatib
*Assistant Examiner* — Gerrad A Foster
(74) *Attorney, Agent, or Firm* — Brooks Kushman P.C.

(57) ABSTRACT

A vehicle may include a processor programmed to control operation of the vehicle. The processor may control operation of the vehicle according to an indication of a direction of travel. The indication of direction of travel may be based on signs of data representing jerk of the vehicle. The signs of data representing jerk may be derived from acceleration and speed sensor outputs. The indication may be such that the indication is reverse in response to the signs being opposite when the vehicle is in a forward drive gear.

14 Claims, 6 Drawing Sheets

INDICATION OF VEHICLE DIRECTION OF TRAVEL

TECHNICAL FIELD

The present disclosure relates to vehicle direction of travel indication.

BACKGROUND

A vehicle control system may obtain speed indication from a brake system module or other module designed to interpret wheel speed sensor output. Wheel speed sensors are generally direction independent. That is, directional information does not accompany speed indication. Consequently, vehicle direction is typically determined using additional sensors or transmission status. These direction detection methods may continue to provide incorrect information or add cost.

SUMMARY

A vehicle may include a processor programmed to control operation of the vehicle. The processor may control operation of the vehicle according to an indication of a direction of travel. The indication of direction of travel may be based on signs of data representing jerk of the vehicle. The signs of data may be derived from acceleration and speed sensor outputs. The indication may be such that the indication is reverse in response to the signs being opposite when the vehicle is in a forward drive gear.

The indication may be forward in response to the signs being same when the vehicle is in a reverse gear. The processor may be further programmed to apply a band-pass filter to the data to remove frequency content indicative of road grade. The processor may control operation of the vehicle by executing an automatic steering command. The processor may control operation of the vehicle by executing an automatic parking command.

DETAILED DESCRIPTION

Figure 1:
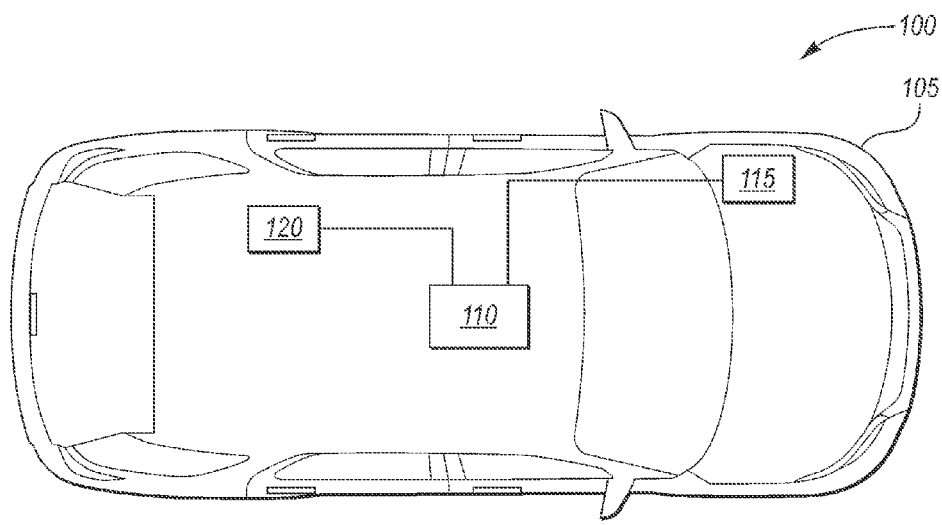
FIG. 1 is an overview of a vehicle having a direction indication system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle longitudinal direction may be used by vehicle control systems or occupants to properly control a vehicle. For example, a vehicle may use longitudinal direction to initiate parking commands or steering commands. A vehicle may also use longitudinal direction to increase or decrease fuel injection. Transmission status may provide adequate indication of vehicle longitudinal direction under certain circumstances. Transmission status, however, may improperly indicate longitudinal direction when a vehicle is on an incline opposite the intended direction of travel. For instance, a vehicle directed uphill on a slope and in a drive or forward gear may travel in a reverse direction if the transmission creep cannot overcome opposing forces. A vehicle controller having speed and acceleration sensor inputs may correct erroneous indications by generating a reverse indication or affirming a proper indication.

Vehicles may include systems to determine speed. A vehicle speed sensor may use magnetic, electric, or optic effects to determine rotations of the wheel, movement in relation to ground, or GPS indication of speed. Any method of speed indication may be used to correct erroneous indications of vehicle longitudinal direction. For instance, the circumference of the wheel and the rotations of the wheel may be used to determine the vehicle longitudinal speed. Vehicles may also include systems to determine acceleration of the vehicle. The accelerometer or acceleration sensor may be of any type (e.g., capacitive, piezoelectric, piezoresistive, Hall Effect, magnetoresistive, etc.).

The outputs to these systems may be fed into a control system configured to interpret the provided digital or analog values. The controller or processor of the control system may manipulate these values to determine a direction of travel for the vehicle. A relationship between speed, acceleration, and jerk, may be utilized by comparing the sign of each jerk value to determine the direction of travel. Just as acceleration is the time derivative of velocity, jerk as used herein is the time derivative of acceleration. Numerical methods may be used to determine the time derivatives of both the velocity and the acceleration to result in two separate values for jerk. If for example the signs are opposite, the determined direction of travel would be reverse even though the vehicle may be in a forward drive gear if rolling backward down a hill. Likewise if the signs are the same, the determined direction of travel would be forward even though the vehicle may be in a reverse gear if rolling forward down a hill.

Numerical methods or approximations, such as Runge-Kutta, Euler's method, etc., may be used to provide a numerical approximation of the rate of change for the speed and acceleration sensors. A time step for the derivative computation may be near 5 ms or as large as 20 ms. Accuracy of the numerical approximation may be improved by reducing the time step, but may require more processing power.

Using these numerical methods a jerk value may be obtained for the speed sensor output and the accelerometer output. Once a value for jerk for each of the sensors is obtained, a band-pass filter may be used to remove unwanted frequency content from the sensor value. A digital bandpass filter may be defined by a z-transfer function a depicted in Equation 1. The band-pass filter may be used to remove the low frequency information from the signal, which may be indicative of the vehicle resting on an incline, and high frequency information from the signal, which may be indicative of instrument noise. Analog or digital filters may be used depending on the input type. For example, a biquad bandpass filter having a transfer function similar to Equation 1 may be used.

$$H = \frac{(z+1)(z-1)}{z^2 - 2r(\cos\varphi)z + r^2} \qquad \text{Equation 1}$$

A preferred passband may be between 1-15 Hz for certain vehicles and 5-20 Hz for other vehicles. A vehicle may be tested at the factory to determine a preferred passband because threshold values vary among different vehicles. Any type of transfer function may be used to remove unwanted frequency content from the sensor jerk values. As is well known in the art, analog systems may be used instead of digital or discrete systems to implement the bandpass filter.

Referring now to FIG. 1, a vehicle direction indication system 100 is shown. A vehicle 105 may include a controller 110 connected, directly or indirectly, to at least one speed sensor 115 and at least one acceleration sensor or accelerometer 120. The speed sensor 115 may be a hall sensor having a magnetic pickup located on the axle or wheel housing of the vehicle. The speed sensor 115 may be electrically connected to the controller 110, sending digital or analog data to be processed. The acceleration sensor 120 may be electrically connected to the controller 110, sending digital or analog data to be processed.

Figure 2:
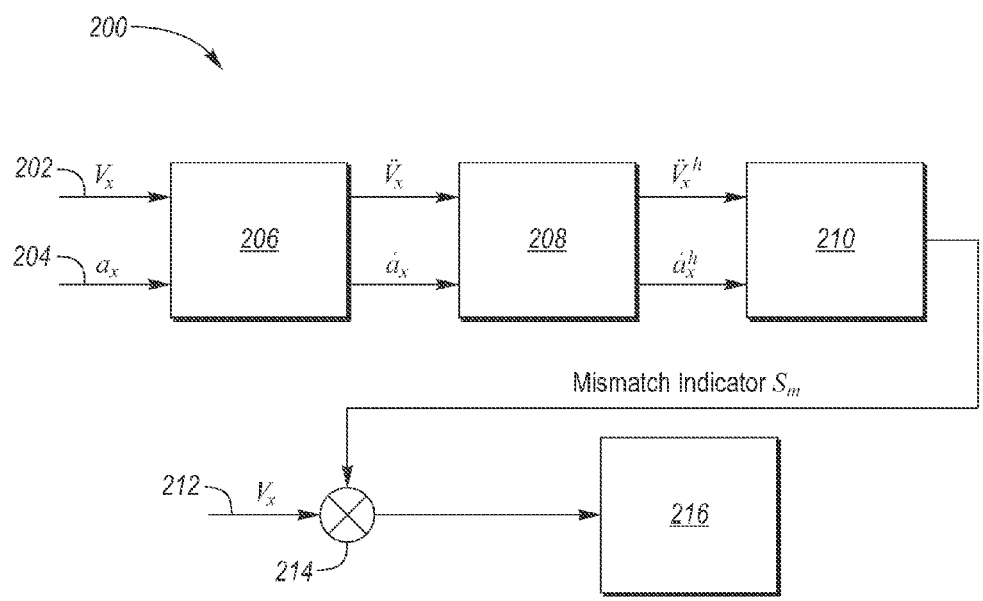
FIG. 2 is a functional diagram for a vehicle direction indication system.

Now referring to FIG. 2, a functional diagram 200 is depicted. The functions included therein may be performed on a controller or processor located within the vehicle or off board as is known in the art. The input from the speed sensor 202 and acceleration sensor 204 are received by a controller. A numerical method 206 may be applied to the speed sensor input 202 to determine the second derivative of the speed signal 202, known as jerk, and similarly applied to the acceleration sensor input 204 to determine the first derivative of the acceleration signal 204, also known as jerk. The jerk values for both the speed and acceleration inputs 202, 204 are filtered through digital signal processing 208 to remove frequencies not within the specified band. The resulting sign of the value is compared at function 210 to determine the direction of travel. A native vehicle speed input 212, which may be the same as the vehicle speed input 202, is given a directional component from the direction of travel determined at function 210 at arithmetic function 214. The vehicle vector is then supplied to the vehicle control system 216.

Figure 3:
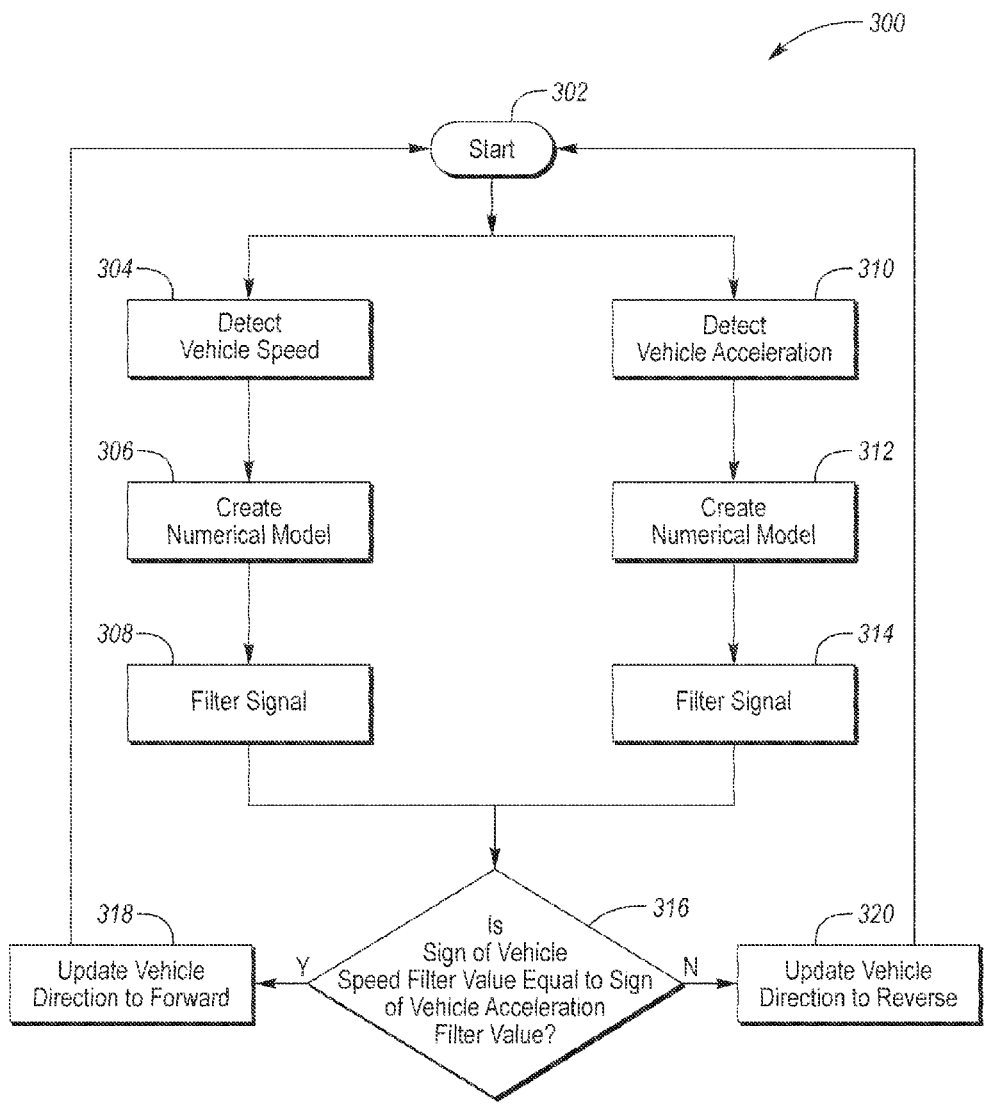
FIG. 3 is a flow diagram of a vehicle direction indication using speed and acceleration sensor outputs.

Now referring to FIG. 3, an algorithm 300 is depicted. Step 302 is the start point of the algorithm. The vehicle speed is detected at step 304. The vehicle acceleration is detected at step 310. At step 306, a numerical model may be applied to the vehicle speed input to determine a jerk value derived from the vehicle speed. At step 312 a numerical model may be applied to the vehicle acceleration input to determine a jerk value derived from the vehicle acceleration.

At step 308 a filter may be applied to the jerk data determined in step 306 to remove high or low frequency content from the data. At step 314 a filter may be applied to the jerk data determined in step 312 to remove high or low frequency content from the data. At step 316 a comparison between the sign of the vehicle speed data and the sign of the vehicle acceleration data is performed. If the sign of the vehicle speed is not equal to the sign of the vehicle acceleration, the vehicle direction is updated in step 320 to reverse. If the sign of the vehicle speed is equal to the sign of the vehicle acceleration, the vehicle direction is updated in step 318 to forward. Then the algorithm returns to step 302.

Figure 4:
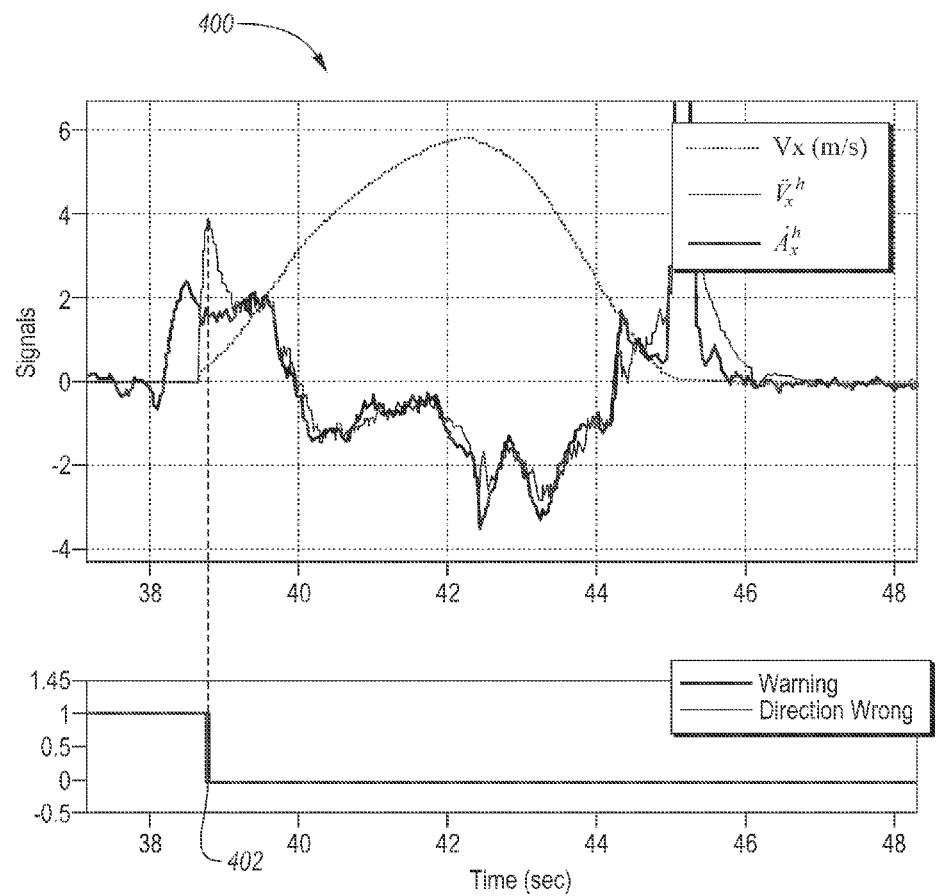
FIG. 4 is an output chart of a vehicle direction indication system depicting generally same signs.

Now referring to FIG. 4, a chart 400 depicting a speed indication ($V_x$), jerk data derived from a speed sensor output ($\dddot{V}_x^h$), and jerk data derived from an acceleration sensor output ($\ddot{A}_x^h$) is shown. The speed indication $V_x$ does not include directional information, meaning $V_x$ is always a positive real number until direction indication is derived. A direction indication relative to the vehicle being in drive is depicted in the sub-chart. From the left side of the chart the sign of $\dddot{V}_x^h$ is different from the sign of $\ddot{A}_x^h$ because until about time of 39 seconds $\dddot{V}_x^h$ is zero and $\ddot{A}_x^h$ is greater than or less than zero. Up until time of 39 seconds the direction wrong indication is set to "1" or "TRUE." After the 39-second mark the sign of both $\dddot{V}_x^h$ and $\ddot{A}_x^h$ are equal and the direction wrong indication falls to "0" or "FALSE" regardless of the vehicle speed.

Figure 5:
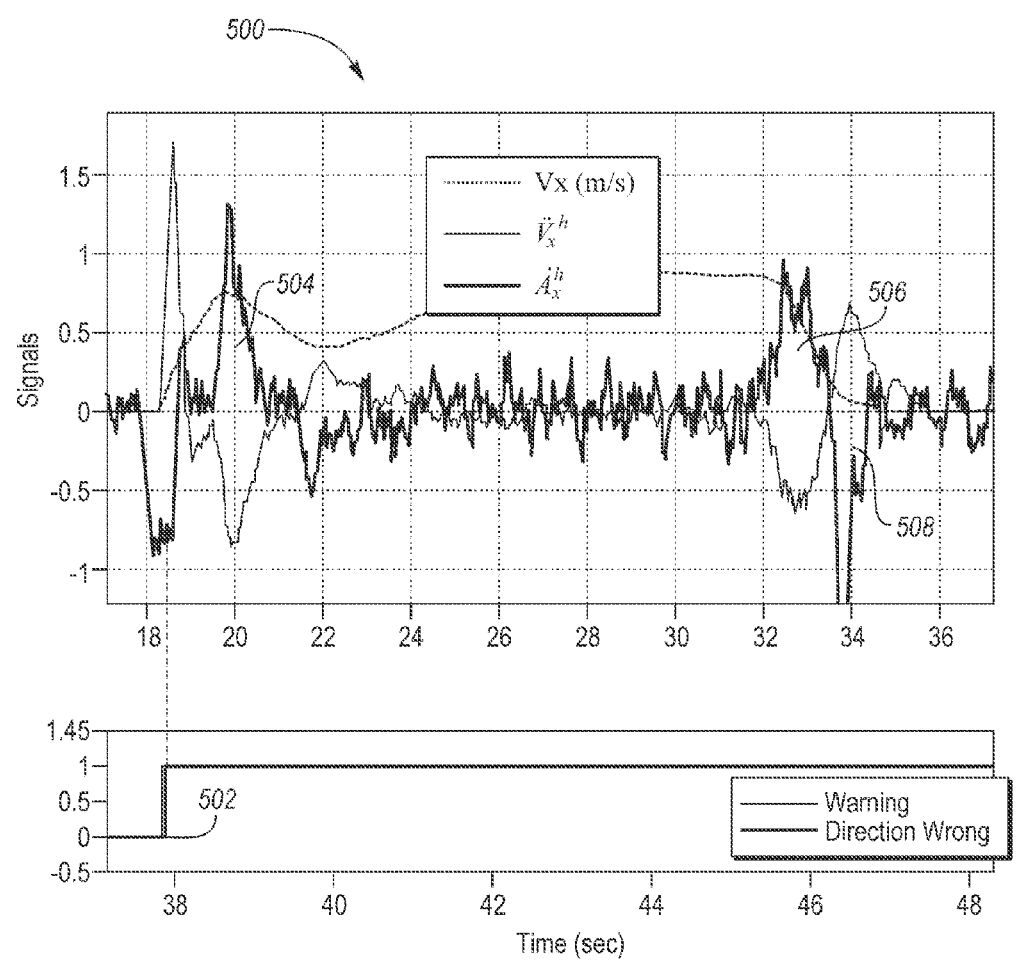
FIG. 5 is an output chart of a vehicle direction indication system depicting generally opposite signs.

Now referring to FIG. 5, a chart 500 depicting a speed indication ($V_x$), jerk data derived from a speed sensor output ($\dddot{V}_x^h$), and jerk data derived from an acceleration sensor output ($\ddot{A}_x^h$) is shown. The initial condition of the direction indication is that the direction is correct. At about the 18-second mark 502 a discrepancy between the signs of $\dddot{V}_x^h$ and $\ddot{A}_x^h$ occurs indicating an incorrect direction. As shown in larger detail at points 504, 506, and 508, the signs of the $\dddot{V}_x^h$ and the $\ddot{A}_x^h$ values are opposite, which indicates a wrong direction situation.

Figure 6:
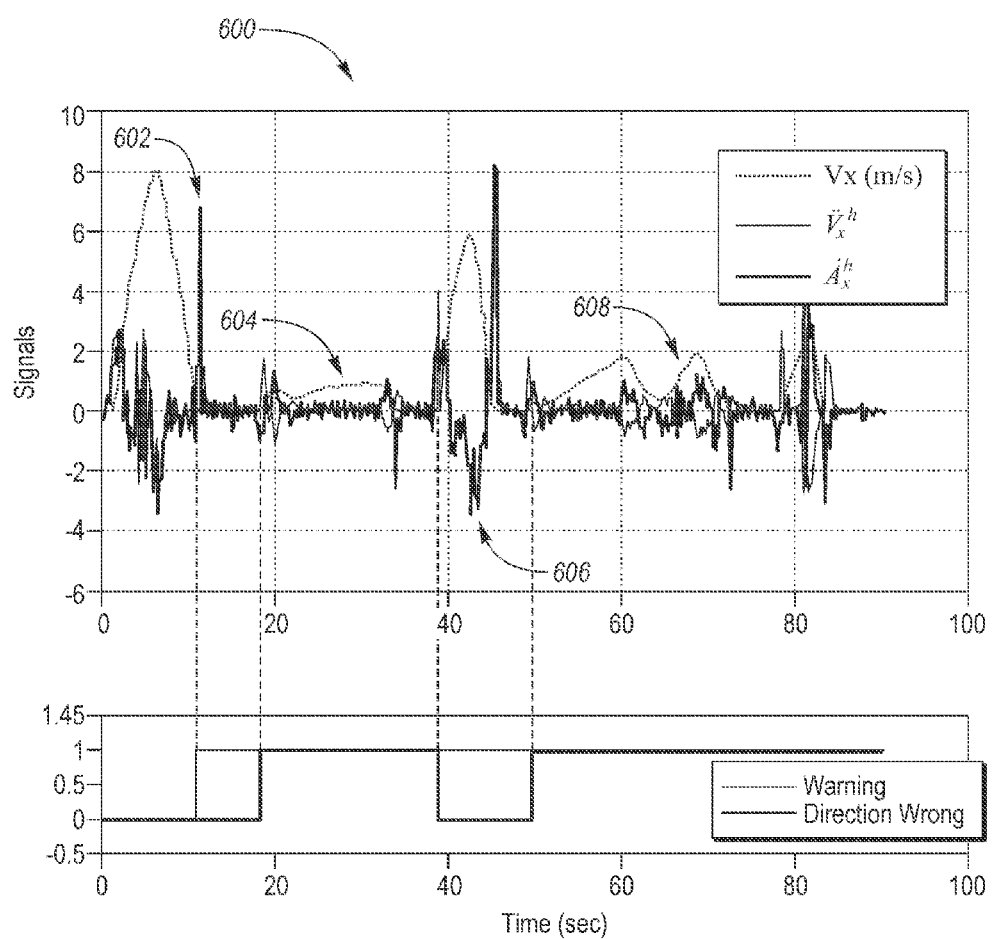
FIG. 6 is an output chart of a vehicle direction indication system oscillating between same and opposite signs.

Now referring to FIG. 6, a chart 600 depicting a speed indication ($V_x$), jerk data derived from a speed sensor output ($\dddot{V}_x^h$), and jerk data derived from an acceleration sensor output ($\ddot{A}_x^h$) is shown. At point 602 a warning for improper speed indication is shown. The warning may be determined by an abrupt change in the jerk value, as derived. Near the 20-second mark and until the 40-second mark, at area 604, the signs of $\dddot{V}_x^h$ and $\ddot{A}_x^h$ become opposite and a direction wrong signal is indicated. Around the 40-second mark the signs become equal, at area 606, until about the 50-second mark. As shown in area 608, the signs of $\dddot{V}_x^h$ and $\ddot{A}_x^h$ are opposite, denoting a wrong direction indication.

Figure 7:
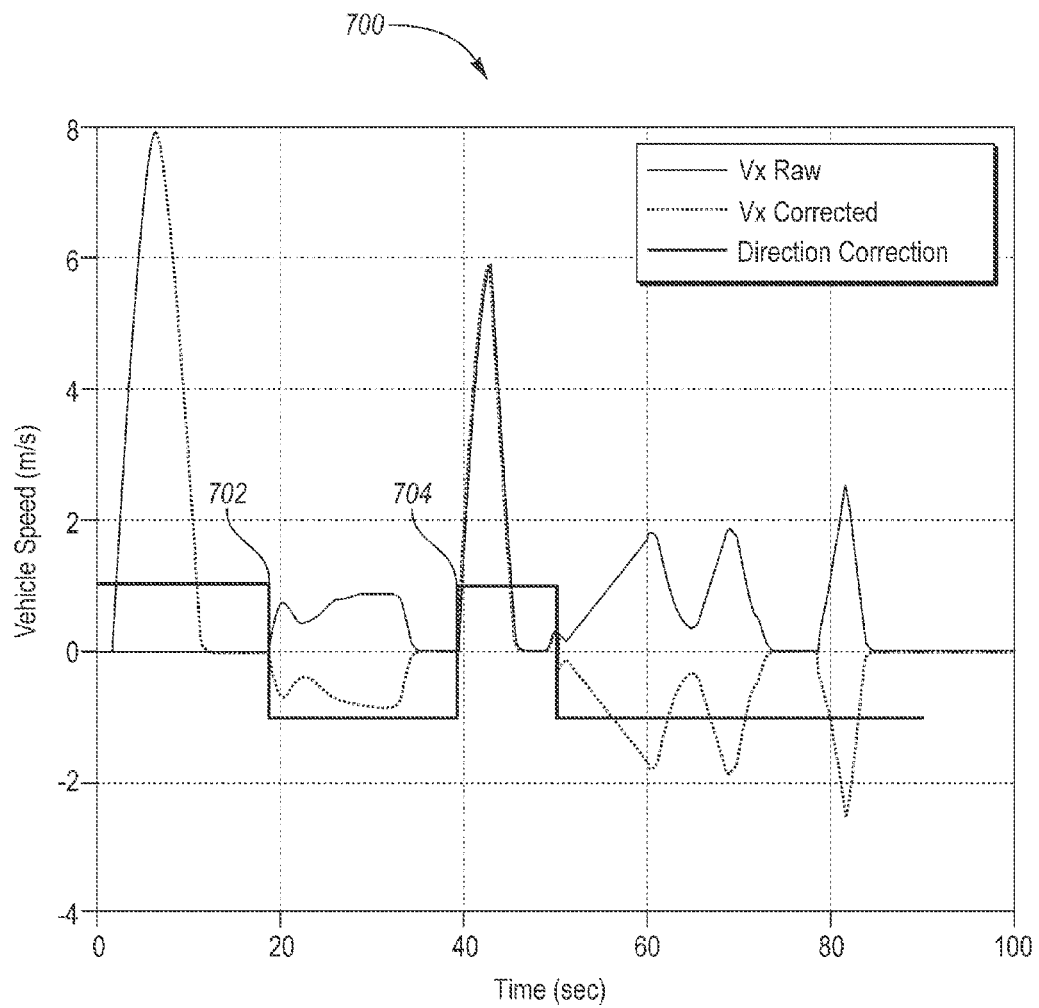
FIG. 7 is an input and output chart of a vehicle direction indication system having a direction correction system.

Now referring to FIG. 7, a chart 700 depicting a raw speed indication ($V_x$ raw), a corrected speed indication ($V_x$ corrected), and a direction correction indication. As shown until about the 20-second mark 702, the $V_x$ raw and $V_x$ corrected signals are equal. At about the 20-second mark 702 the direction correction flips to indicate that the $V_x$ raw signal is incorrect. Until about the 40-second mark 704 the $V_x$ corrected signal is used, as an inverse of the $V_x$ raw signal, to provide the vehicle control system with a velocity including speed and direction.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising: an acceleration sensor; a speed sensor; and a processor programmed to control operation of the vehicle according to an indication of direction of travel that is based on a sign of data representing jerk of the vehicle derived from the acceleration sensor output and a sign of data representing jerk of the vehicle derived from the speed sensor output such that the indication is reverse responsive to the signs being opposite when the vehicle is in a forward drive gear.

2. The vehicle of claim 1, wherein the indication is forward in response to the signs being same when the vehicle is in a reverse gear.

3. The vehicle of claim 1, wherein the processor is further programmed to apply a band-pass filter to the data to remove frequency content indicative of road grade variation.

4. The vehicle of claim 1, wherein controlling operation of the vehicle includes executing an automatic steering command.

5. The vehicle of claim 1, wherein controlling operation of the vehicle includes executing an automatic parking command.

6. A method comprising: by a controller of a vehicle gathering, from an acceleration sensor of the vehicle, acceleration sensor output; gathering, from a speed sensor of the vehicle, speed sensor output; and generating a reverse indication of direction of travel in response to a sign of data representing jerk derived from the acceleration sensor output and a sign of data representing jerk derived from the speed sensor output being opposite when the vehicle is in a forward drive gear; and controlling operation of the vehicle according to the reverse indication.

7. The method of claim 6 further comprising generating a forward indication of direction of travel in response to the signs being same when the vehicle is in a reverse gear.

8. The method of claim 6 further comprising applying a band-pass filter to the data to remove frequency content indicative of road grade variation.

9. The method of claim 6 further comprising executing an automatic steering command based on the indicated direction of travel.

10. The method of claim 6 further comprising executing an automatic parking command based on the indicated direction of travel.

11. A vehicle comprising: an acceleration sensor; a speed sensor; and a processor programmed to execute automatic steering commands according to a forward indication of direction of travel that is generated in response to signs of data, representing jerk of the vehicle derived from the acceleration sensor output and the speed sensor output, being same when the vehicle is in a reverse gear.

12. The vehicle of claim 11, wherein the processor is further programmed to execute automatic steering commands according to a rearward indication of direction of travel that is generated in response to signs of data, representing jerk of the vehicle derived from acceleration and speed sensor outputs, being opposite when the vehicle is in a forward drive gear.

13. The vehicle of claim 11, wherein the processor is further programmed to apply a band-pass filter to the data to remove frequency content indicative of road grade variation.

14. The vehicle of claim 11, wherein the automatic steering commands park the vehicle.

* * * * *